United States Patent [19]
Marand

[11] 3,741,443
[45] June 26, 1973

[54] DISPENSING SYSTEM WITH PROPELLANT METERING VALVE

[75] Inventor: Jean Marand, Saint-Benoit, France

[73] Assignee: Ciba-Geigy Corporation, Ardsley, N.Y.

[22] Filed: Nov. 19, 1970

[21] Appl. No.: 90,896

[52] U.S. Cl. ............................................. 222/145
[51] Int. Cl. ......................................... B65d 83/14
[58] Field of Search .................... 222/402.24, 136, 222/193, 145, 402.23, 399; 239/303, 308, 350

[56] References Cited
UNITED STATES PATENTS

| | | | |
|---|---|---|---|
| 3,549,052 | 12/1970 | Forim | 222/135 |
| 3,408,010 | 12/1968 | Fukui | 239/308 |
| 3,174,659 | 3/1965 | Sober et al. | 222/394 |

Primary Examiner—Stanley H. Tollberg
Attorney—Wenderoth, Lind & Ponack

[57] ABSTRACT

A product container has a valve coupled to one flow passage of a coupler-aspirator. A second flow passage is coupled to a hollow section of a propellant metering valve stem. The stem is movable within the chamber of a valve body member. The member is sealed to a propellant cartridge. An aperture in the hollow section of the stem is without the chamber when the metering valve is closed, but within the chamber when the metering valve is open. The stem has a solid section having a slot on the outer periphery thereof. Communication between the interior of the cartridge and the chamber through the slot is unblocked when the metering valve is closed, but is blocked when the metering valve is open.

1 Claim, 4 Drawing Figures

INVENTOR
JEAN MARAND

DISPENSING SYSTEM WITH PROPELLANT METERING VALVE

BACKGROUND OF INVENTION

The present invention relates to a novel propellant metering valve for use in a dispensing system of the type wherein the product or products are aspirated through a coupler-aspirator by a propellant which is housed in a propellant cartridge separate from the product or products.

This invention is related to the dispensing systems disclosed in applicant's copending applications:

Ser. No. 43,417, filed June 4, 1970 now U.S. Pat. No. 3,670,965,

Ser. No. 48,336, filed June 22, 1970 now U.S. Pat. No. 3,672,544, and

Ser. No. 50,394, filed June 29, 1970 now U.S. Pat. No. 3,704,812.

In these copending applications are disclosed dispensing systems of the type wherein a product or products are housed in a product container separate from the propellant. A coupler-aspirator is coupled to and positioned above the product container. When the top of the propellant cartridge is depressed, both the valve thereof and the product container valve are opened, and the product or products are aspirated through the coupler-aspirator by the propellant. However, it is not possible in the use of these dispensing systems to precisely dispense a predetermined quantity of product.

OBJECTS AND BRIEF DESCRIPTION OF THE INVENTION

It is therefore a primary object of the present invention to provide a propellant metering valve for use in propellant cartridges to be used in the types of dispensing systems disclosed in these said copending applications.

It is a further object of the present invention to provide such a propellant metering valve which may be inexpensively manufactured by routine molding techniques.

These objects are achieved in accordance with the present invention by the provision of a propellant valve stem including a hollow section and a solid section. The stem is mounted for movement within a valve body member. The valve body member is sealingly attached to the propellant cartridge. A metering chamber is formed within the interior of the valve body member. A spring within the chamber urges the stem to a closed position. An aperture extends through the stem in the hollow section thereof and is positioned outside of the chamber when the stem is in the closed position. A longitudinal slot is provided on the outer periphery of the solid section of the stem to provide communication between the interior of the propellant cartridge and the chamber when the stem is in the closed position. Thus, propellant fills the chamber when the stem is in the closed position. The stem is coupled to one flow passage of a coupler-aspirator. When the propellant cartridge is depressed, the valve body member is moved longitudinally downwardly with respect to the stem. Communication between the interior of the propellant cartridge and the chamber is closed. The aperture in the hollow section of the stem member is within the chamber. Thus, communication is open for the propellant within the chamber through the hollow stem and into the coupler-aspirator. The coupler-aspirator is coupled to the stem of a product container valve. As the propellant cartridge is further depressed, the coupler-aspirator is caused to move downwardly with respect to the product container valve. The product container valve is thus opened, and the product is aspirated through the coupler-aspirator by the propellant. However, only a predetermined quantity of product will be aspirated with each depression of the propellant cartridge. This is true since only a predetermined amount of propellant is available with each actuation.

Other objects and features of the invention will be made clear by the following description taken together with the accompanying drawings.

DETAILED DESCRIPTION OF THE INVENTION

Figure 1:
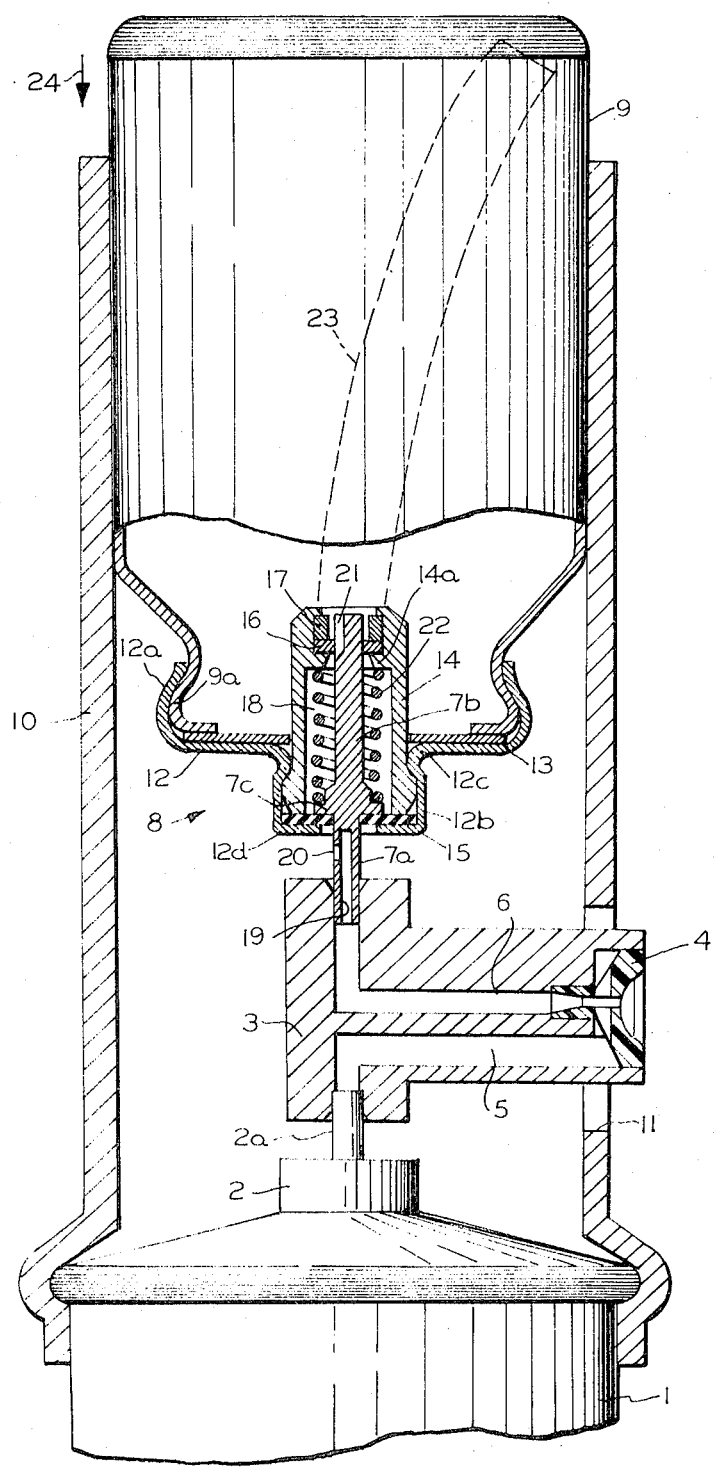
FIG. 1 is a view partially in cross-section and partially in elevation of a first embodiment of the novel propellant metering valve of the present invention used in a dispensing system.

With reference now to FIG. 1 of the drawings, the type of dispensing system in which the novel propellant metering valve of the present invention is used will be described. A product container 1 is adapted to contain a product or products to be dispensed therefrom. Product container 1 may be made of any suitable or desirable material such as plastic or metal. A product container valve 2 of any suitable design extends through the top of the product container 1. Product container valve 2 contains suitable product flow passages (not shown) to provide communication of the product or products within product container 1 with the stem 2a of the product container valve.

A coupler-aspirator 3 has a Venturi nozzle insert 4 therein. Communicating with nozzle 4 are first and second flow passages 5 and 6, respectively. First flow passage 5 is coupled to and communicates with stem 2a. Second flow passage 6 is coupled to and communicates with a hollow section 7a of the stem of a propellant metering valve 8. Propellant metering valve 8 extends into a propellant cartridge 9 containing a suitable propellant. Product container 1 is provided with a guide 10 which is adapted to fit in any conventional manner such as a snap fit over the top of the product container. Guide 10 acts to guide and laterally support propellant cartridge 9, as shown in FIG. 1. Coupler-aspirator 3 extends to and sprays through an opening 11 in guide 10.

A crimped section 12a of a lid 12 is adapted to tightly fit over a crimped section 9a of propellant cartridge 9. Between portions 9a and 12a is crimped an annular gasket 13 to create a high pressure seal. An annular valve body member 14 is positioned within a downwardly extending flange portion 12b of lid 12 and held in place therein by an additional crimped portion 12c. Between an inwardly extending flange portion 12d of lid 12 and one end of body member 14 is held a first flexible annular gasket 15 to create a high pressure seal. The inner periphery of gasket 15 seals against the outer periphery of section 7a.

The upper portion of valve body member 14 has an inwardly extending flange 14a therein which supports a second flexible annular gasket 16. Gasket 16 is held tightly in place by a lock ring 17. The propellant valve stem having a hollow section 7a and a solid section 7b is slidably movable within chamber 18 within body member 14. Hollow stem section 7a has a longitudinal channel 19 therein. An aperture 20 extends through stem section 7a into channel 19. Solid stem section 7b has a longitudinal slot 21 formed in the outer periphery thereof. A spring 22 acts upon outwardly extending flange portion 7c of the stem to urge the stem in the downwardly or closed position as illustrated in FIG. 1. In this position, aperture 20 is outside of chamber 18, and slot 21 provides communication between the interior of propellant cartridge 9 and chamber 18. Thus, when the valve is in the closed position as illustrated in FIG. 1, chamber 18 will have propellant therein, but communication of the propellant into the coupler-aspirator is closed. Additionally, if the propellant within cartridge 9 is a liquefied gas propellant, a dip tube 23 may be provided since the cartridge will normally be used in the inverted position as shown in FIG. 1.

Figure 2:
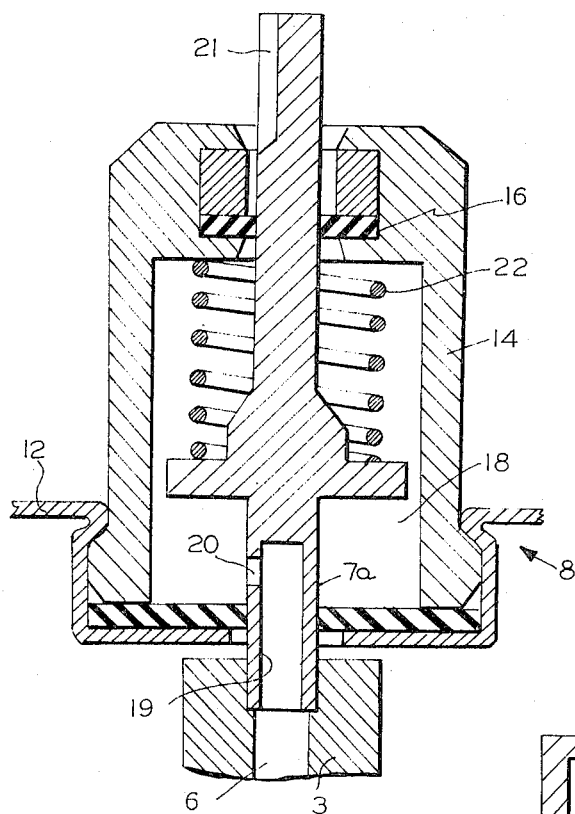
FIG. 2 is a cross-sectional view of the valve of FIG. 1 in the actuated or open position.

The operation of the dispensing system shown in FIG. 1 will now be described in detail. The operator grasps the unit generally around guide 10. Force is then applied by finger or thumb in the general direction of arrow 24 to the top of propellant cartridge 9. As cartridge 9 is depressed, lid 12 and valve body member 14 move therewith. However, as shown in FIG. 2, the propellant valve stem is prevented from moving therewith by coupler-aspirator 3. Therefore, the propellant valve stem is caused to be moved within chamber 18 against the force of spring 22. Aperture 20 is thus brought within chamber 18. Slot 21 is moved out of chamber 18 such that the inner periphery of gasket 16 creates a high pressure seal with the outer periphery of solid stem section 7b.

It will thus be apparent that the propellant within chamber 18 escapes through aperture 20 and channel 19 into second flow passage 6 of coupler aspirator 3. As further force is applied, the coupler-aspirator 3 is caused to be moved downwardly by the propellant valve stem. This force is transferred to stem 2a, thereby opening product container valve 2. Thus, as the propellant cartridge is depressed, both the propellant metering valve 8 and the product container valve 2 are opened. Only force sufficient to open the stiffer of these two valves is required. When both valves are opened, the propellant will aspirate the product through the nozzle 4. However, it will be further apparent that this aspiration will continue only until the propellant in chamber 18 is used. Since slot 21 no longer provides communication from the interior of cartridge 9 into chamber 18, only a specific predetermined metered quantity of propellant is available upon each actuation of the dispensing unit. Therefore, it will be readily apparent that the specific amount of product dispensed by the dispensing system can be predetermined and metered.

Figure 3:
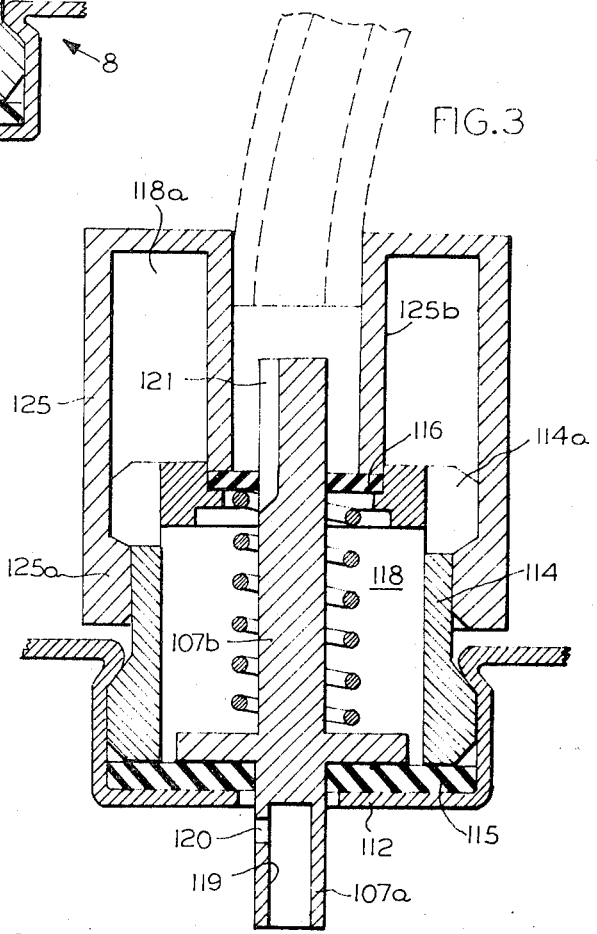
FIG. 3 is a cross-sectional view of a second embodiment of a novel propellant metering valve in accordance with the present invention.

With reference now to FIG. 3 of the drawings, a second embodiment of the present invention will be described. This embodiment is similar to the embodiment of FIGS. 1 and 2, with the exception that means are provided to allow for a much larger metering chamber. Between valve body member 114 and cartridge lid 112 is positioned a first annular gasket 115 to create a high pressure seal. The propellant valve stem includes a hollow section 107a having a channel 119 and an aperture 120 and a solid section 107d having a slot 121 therein. The stem is longitudinally movable within chamber 118 of body member 114. However, body member 114 has slot sections 114a therein. Around valve body member 114 is positioned a second annular valve body member 125 having an outer flange 125a which tightly contacts the outer periphery of body member 114 and an inner flange member 125b which acts to retain second annular gasket 116 in place. It will be apparent that the interior of the second annular body member 125 provides an additional chamber 118a. Therefore, the total volume of the metering chamber is the volume of both chambers 118 and 118a. The metering valve of FIG. 3 works in precisely the same manner as the valve shown in FIGS. 1 and 2. The only difference is that a larger volume of propellant is available for each actuation; and therefore, a larger amount of product may be dispensed. The total volume of propellant to be metered may be varied by merely changing the second annular valve body member to thus provide a different volume 118a.

Figure 4:
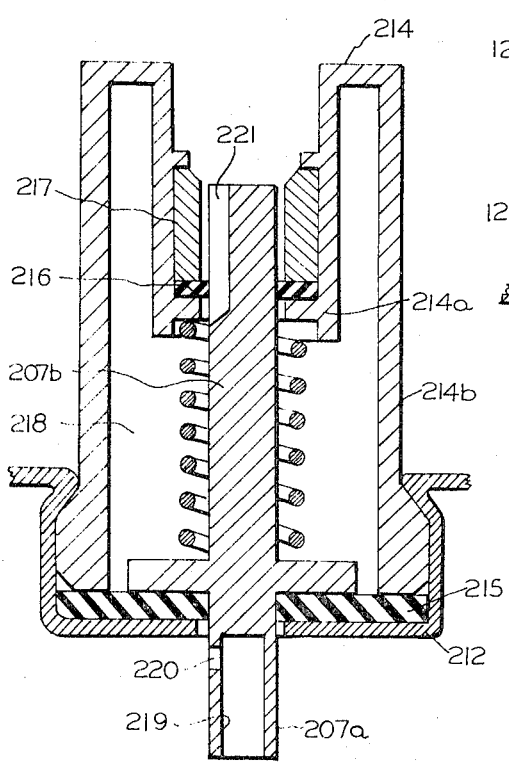
FIG. 4 is a cross-sectional view of a third embodiment of a novel propellant metering valve in accordance with the present invention.

With reference now to FIG. 4 of the drawings, a third embodiment of the novel propellant metering valve of the present invention will be described. The valve of FIG. 4 is similar to the valve of FIG. 3, with the exception that the two separate body members 114 and 125 of FIG. 3 have been combined into a single body member 214 in FIG. 4. The first annular gasket 215 is held in place between cartridge lid 212 and an outer annular flange 214b of body member 214 to provide a high pressure seal. The propellant valve stem includes a hollow section 207a having a channel 219 and an aperture 220 therein and a solid section 207b having a slot 221 therein. Body member 214 has an inner annular flange 214a which supports second annular gasket 216. Lock ring 217 holds gasket 216 in place. It will be apparent that a single relatively large metering chamber 218 is provided. The valve of FIG. 4 operates in precisely the same manner as the valves of the previously discussed embodiments.

It is to be understood that the propellant cartridge need not be specially designed with regard to the quantity of the product contained in the dispensing unit. When the propellant is exhausted, it need be merely replaced by another similar propellant cartridge. Additionally, when the products are exhausted and when some of the propellant remains, the propellant cartridge may be transferred to a new product container. Thus, it is apparent that the system in accordance with the present invention eliminates waste of both the product and the propellant.

It is to be further understood that all of the various elements of the present invention may be made of any convenient or desirable material such as plastic. These elements can easily be made by conventional molding techniques, thus making possible the provision of such a device at a low cost.

Although preferred embodiments of the present invention have been described in detail, such description is intended to be illustrative only, and not restrictive, since many details of the construction of the invention may be altered or modified without departing from the spirit or scope thereof.

I claim:

1. A dispensing system comprising a product container housing a product and having a valve means mounted on the top thereof for selectively dispensing said product; a coupler-aspirator mounted above said product container and having first and second coupling means, the first of said coupling means connected to said valve means, said coupler-aspirator further having a Venturi nozzle having a throat portion and first and second flow passages joining at said nozzle, the first of said flow passages communicating with said first coupling means and the second of said flow passages communicating with said second coupling means, said Venturi throat portion located in said second flow passage, said first flow passage being in fluid communication with said Venturi throat portion; and a propellant cartridge positioned above said coupler-aspirator and vertically aligned with said container and having a propellant metering valve extending therethrough and connected to said second coupling means, said propellant metering valve comprising a first valve body member secured to said cartridge, said first body member having a chamber therein, a stem longitudinally movable within said chamber, a first flexible annular gasket positioned at a first end of said first valve body member with the inner periphery thereof sealing against the outer periphery of a first section of said stem, a second flexible annular gasket positioned at a second end of said first valve body member with the inner periphery thereof sealing against the outer periphery of a second section of said stem, means to urge said stem toward said first end of said first valve body member, said first valve body member having slot sections therein, a second annular body member positioned around said first valve body member to provide a second chamber therebetween, said slot sections providing communication between said chambers, said first section of said stem having a longitudinal channel therethrough in communication with said second flow passage and an aperture extending through said stem into said channel, and said second section of said stem having a longitudinal slot in the outer periphery thereof; whereby depression of said cartridge and said coupler-aspirator opens said valve means and said metering valve and a metered quantity of propellant from said cartridge aspirates a metered quantity of said product through said Venturi nozzle.

* * * * *